United States Patent Office 3,331,823
Patented July 18, 1967

3,331,823
COPOLYMERS OF VINYLIDENE FLUORIDE WITH 1,2,3,3,3-PENTAFLUOROPROPYLENE
Dario Sianesi, Gian Carlo Bernardi, and Antonino Reggio, all of Milan, Italy, assignors to Montecatini Edison S.p.A., a corporation of Italy
No Drawing. Filed Mar. 31, 1964, Ser. No. 356,073
Claims priority, application Italy, Apr. 1, 1963, 6,601/63
27 Claims. (Cl. 260—87.7)

This invention relates to new fluorinated polymeric products and to a process for their preparation. More particularly, this invention relates to fluorinated thermoplastic or elastomeric copolymers whose macromolecules are made up of monomeric units of vinylidene fluoride and of pentafluoropropylene, with the proviso that the pentafluoropropylene be composed of at least 1% of 1,2,3,3,3-pentafluoropropylene.

For years there has been a need for thermoplastic or elastomeric polymers that possess a high degree of chemical and thermal stability as well as resistance to the dissolving or aggressive action exerted by various liquids, and which polymers are at the same time easily workable and shapable into a variety of useful objects.

It is known that high fluorine content thermoplastic polymers, such as polytetrafluoroethylene and polytrifluorochloroethylene, find useful application by virtue of their chemical inertia and thermal and chemical resistance. At the same time, however, certain other physical properties, such as insolubility in organic solvents at room temperature, limit, to a large extent, the possibility for these polymers to be employed to make continuous films or protective coatings adhering to surfaces of various kinds, or for impregnating purposes.

In addition to the need for thermoplastic fluorinated polymers with improved use properties, it is also highly desirable to provide synthetic elastomers having good physical and mechanical characteristics, both at high and low temperatures, that at the same time possess chemical inertia to corrosive agents, resistance to various solvents, such as lubricating oils and fuels, and which can be easily vulcanized and shaped into useful objects.

It is therefore an object of this invention to provide new fluorinated polymeric products with improved properties, as well as a process for their preparation.

A further object is to provide thermoplastic polymers containing fluorine, characterized in that they can be easily shaped and worked with conventional techniques, and which are also able to form continuous films and protective coatings.

According to the present invention, we have now found a new class of polymers of fluorinated unsaturated monomers, characterized in that they withstand the dissolving action of lubricating oils and fuels, of various aliphatic and aromatic hydrocarbons, resist the attack exerted by aggressive chemical reagents, possess high mechanical resistance and high flexibility within a wide temperature range, and are soluble in relatively volatile organic solvents at room temperature.

Certain polymers of the present invention also show elastomeric properties and are characterized in that they are easily vulcanizable, retain elastic properties on exposure to high and low temperatures, resist the degradation effect of high temperatures up to above 250° C., and resist the swelling, dissolving and aggressive action of various organic liquids and chemicals.

The polymers, according to the present invention, are prepared by copolymerizing 99 to 5 parts by weight of vinylidene fluoride with 1 to 95 parts by weight of a mixture of olefins having the general formula $C_3F_5H$ containing at least 1% and up to 100% of 1,2,3,3,3-pentafluoropropylene, the remainder consisting substantially of 1,1,3,3,3-pentafluoropropylene.

The copolymerization or terpolymerization of the present invention is preferably carried out in the presence of a free-radical forming initiator and may be conducted in an aqueous or non-aqueous liquid medium. The polymerization process is carried out at temperatures ranging from about −30° to about 200° C., and preferably from 0° to 150° C., under a pressure ranging from about atmospheric pressure to about 300 atm.

The polymers obtainable, in accordance with the present invention are very useful products adaptable to a great number of practical applications because their properties range, according to the composition, from those of stiff, crystalline thermoplastic resins to those typical of rubberlike materials showing various degrees of flexibility, extensibility and elasticity. These rubberlike materials can be easily vulcanized and worked.

It has in fact been observed that while polyvinylidene fluoride is a highly crystalline resinous product which, at room temperature, shows no elastic characteristics, a gradual appearance of the elastomeric characteristics is brought about by introducing into its macromolecules increasing amounts of copolymerized units of 1,2,3,3,3-pentafluoropropylene, which progressively destroy chain symmetry and hence crystallinity.

Quite similar modifications are obtained when monomeric units of 1,2,3,3,3-pentafluoropropylene and 1,1,3,3,3-pentafluoropropylene are simultaneously introduced into the macromolecules of polyvinylidene fluoride.

1,2,3,3,3-pentafluoropropylene $$[CF_3-CF=CFH]$$

which, when copolymerized with vinylidene fluoride, provides the products of this invention, is a known compound, easily obtainable by the processes indicated in the literature (see for instance R. N. Haszeldine, B. R. Steele, J. Chem. Soc. 1592 (1953). A convenient method for the synthesis of 1,2,3,3,3-pentafluoropropylene comprises, for instance, the gas phase catalytic hydrogenation of hexafluoropropylene, in the presence e.g. of palladiated alumina at temperatures between 30° and 300° C., under atmospheric pressure, and dehydrofluorination of the intermediate 1,2-dihydrohexafluoropropane, $CF_3CFH-CF_2H$. This de-hydrafluorination may be carried out, for instance, by simply passing gaseous hexafluoropropane into an alkaline liquid medium, e.g. into melted KOH or KOH in aqueous solution at temperatures above 100° C. The olefin $C_3F_5H$ obtainable by this process consists of pure 1,2,3,3,3-pentafluoropropylene (B.P. −17.5° C.), practically free of other structural isomers.

1,2-dihydrohexafluoropropane may also be de-hydrofluorinated in the gas phase under atmospheric pressure by heating, at temperatures e.g. between 300° C. and 900° C., both in the absence of, or in the presence of suitable agents having catalytic activity, such as for instance NaF, KF and KCl. Under these conditions, mixtures of olefins ($C_3F_5H$) normally made up of both 1,2,3,3,3-pentafluoropropylene and 1,1,3,3,3-pentafluoropropylene are generally obtained. These olefin mixtures may be directly employed in copolymerization with vinylidene fluoride to provide the products which are the object of the present invention.

Up to the present, 1,2,3,3,3-pentafluoropropylene has never been regarded as a polymerizable monomer, nor have examples ever been described, in scientific and patent literature, of its homopolymerizates and copolymerizates with olefins containing carbon to fluorine bonds.

We have now found that under the conditions of this invention it is possible to subject mixtures of 1,2,3,3,3-pentafluoropropylene and vinylidene fluoride to copolymerization, thereby obtaining high yields of a copolymer containing up to 50% by mols (approximately 70% by weight) of copolymerized monomeric units of 1,2,3,3,3-pentafluoropropylene.

Analogous results are attained if a mixture of olefins of the general formula $C_2F_5H$ is substituted for the 1,2,3,3,3-pentafluoropropylene to be copolymerized with vinylidene fluoride, said mixture, however, containing more than 1% of the 1,2,3,3,3-pentafluoropropylene isomer and the rest consisting of the 1,1,3,3,3-pentafluoropropylene isomer. In this case the resulting terpolymer may contain up to 50% by mols of the copolymerized units of the general formula $C_3F_5H$, not less than 1% of which is derived from 1,2,3,3,3-pentafluoropropylene isomer. For convenience, the expression "pentafluoropropylene" normally used in the remaining text is intended to comprise, where not more precisely specified, both the pure isomer 1,2,3,3,3-pentafluoropropylene, and mixtures of the two isomers 1,2,3,3,3-pentafluoropropylene and 1,1,3,3,3-pentafluoropropylene wherein the first isomer is present in proportions of not lower than 1%.

According to the present invention, the preferred initiators for the copolymerization of vinylidene fluoride with pentafluoropropylene are those usually known as free-radical initiators, namely compounds that decompose to generate free radicals. They may be, for instance, selected from peroxy organic compounds, peroxy inorganic compounds, certain aliphatic azoderivatives etc. The initiator is usually employed in amounts varying from 0.001 to 5 parts by weight per 100 parts by weight of the aggregate monomers and preferably in amounts between 0.01 and 2% by weight. The chemical nature of the preferred catalyst, as well as the preferred reaction temperature, are closely related to the other conditions selected to carry out the copolymerization. The copolymerization may be carried out either continuously or batchwise, with an aqueous or non aqueous system, which may be in suspension, emulsion and solution. In this last case, aliphatic alicyclic or aromatic hydrocarbon solvents and oxygen-containing solvents such as alcohols, esters and ethers, ketones can be used. However, halogenated or perhalogenated solvents, such as lower chlorosubstituted hydrocarbons, fluorotrichloromethane, dichlorotetrafluoroethane, perfluorocyclobutane, perfluorodimethylcyclobutane, perfluorocyclohexane, perfluoropropylpyrane, etc. are preferably employed. The use of the same monomeric mixture as the only reaction medium, without resorting to other diluents can also prove convenient, provided it is at least in part in the liquid state under the reaction conditions. In all these cases, halogenated or non halogenated organic peroxides or hydroperoxides, such as dialkyl or diacyl peroxides, peroxides of acids, esters, ketones, are preferably used as polymerization initiators. Typical examples of these initiators are: benzoyl, p-chlorobenzoyl, 2,4-dichlorobenzoyl, acetyl, lauroyl peroxides, t.butyl perbenzoate, cyclohexanone peroxides and hydroperoxides, trichloroacetyl, trifluoroacetyl, perfluoropropionyl peroxides, the peroxide of heptafluorobutyric acid etc. Certain azo compounds, such as alpha-alpha'-azo-diisobutyronitrile; alpha-alpha'-azoethylnitrile etc. can also be usefully employed as polymerization initiators.

According to a preferred embodiment of the invention, the polymerization is conducted in an aqueous phase. In this case the preferred initiators are water-soluble peroxy compounds, such as salts of an inorganic peracid. Typical representatives of this class are, for instance, persulfates, perphosphates, perborates, percarbonates of sodium, potassium, calcium, ammonium, barium etc., hydrogen peroxide, barium peroxide etc. Water-soluble organic peroxy compounds, such as cumene hydroperoxide, di- and tri-isopropylbenzene hydroperoxides and t-butyl hydroperoxide, can also be used with advantage. When the copolymerization of vinylidene fluoride with pentafluoropropylene is carried out in the presence of an aqueous phase, the preferred reaction temperatures range from 20° to 110° C., under an overall pressure in the range of from 5 to 200 atm., or above. Other substances acting as polymerization activators and accelerants may be conveniently added to the peroxidated compound, which in the aqueous phase acts as an initiator.

Water-soluble reducing substances, such as e.g. bisulfite, metabisulfite, thiosulfate of sodium etc. may be used, in amounts preferably ranging from 0.001 to 1% by weight of the aggregate monomers, as activators.

Water-soluble salts of metals occurring in various valence states, such as e.g. sulfates, nitrates, phosphates, chlorides of iron, copper, silver, titanium etc., may be conveniently employed as polymerization accelerants. These compounds are preferably used in amounts ranging from 0.001 to 1 part per 100 parts of the aggregate monomers.

The addition of a suitable buffer, generally in an amount of from 0.1 to 10%, such as e.g. sodium metaborate, sodium mono- or biphosphate etc., to the aqueous polymerization system may also prove convenient to maintain the pH value constant during the entire course of the copolymerization. pH values between 6 and 9 are generally preferred.

The copolymeric products of pentafluoropropylene and vinylidene fluoride obtained in accordance with the invention usually process a very high molecular weight, normally about 20,000. If copolymeric products with a more limited degree of polymerization are desired, the use of suitable chain-transfer agents, such as e.g. lauroyl-mercaptan, chloroform, carbon tetrachloride etc., in amounts generally not higher than 10% by weight and generally between 0.001% to 10% by weight of the aggregate monomers, proves advantageous. The specific amount of modifiers employed depends on the decrease in molecular weight which is desired in the copolymer.

Vinylidene fluoride-pentafluoropropylene copolymers obtained by reaction in the presence of an aqueous phase, in most cases, appear in a dispersed form, making up a latex which can be easily coagulated e.g. by the addition of salts, acids and bases or by stirring or heating or cooling. If the product is desired in the form of a very stable, homogeneous latex, a dispersing or surface active agent may be added to the aqueous phase prior to the reaction. Salts of fatty acids having from 12 to 20 carbon atoms may be conveniently employed as dispersing agents, preferably in amounts in the range of 0.001 to 5% by weight of the aggregate monomers. Examples of said substances are sodium stearate and oleate, and potassium palmitate. However, alkaline and ammonium salts of perfluorinated ω-hydroperfluorinated or chlorofluorinated acids with more than six carbon atoms per molecule, such as e.g. ammonium perfluorocaprilate, are preferably used.

A preferred mode of carrying out the copolymerization according to the present invention consists of introducing the reaction catalyst, the various additives, and a mixture of vinylidene fluoride and pentafluoropropylene, in such proportions as to have the desired composition in the resulting copolymer, into a reaction vessel made of a material capable of withstanding the chemical attack of the reactants present and the pressure applied, which is fitted with a stirring device and contains water. As the monomers are consumed in the reaction, a mixture of vinylidene fluoride and pentafluoropropylene of a composition equivalent to the one desired in the copolymer is fed continuously to the reactor in such a way as to maintain the pressure in the reactor constant during the course of the reaction. It is also preferable to send an aqueous solution containing the polymerization initiator, the accelerant and in general all the ingredients regarded as necessary to a good reaction course, continuously into the reactor, while continuously discharging an equivalent volume of the aqueous dispersion of the formed copolymer.

The copolymeric products of the present invention have a content of between 1% and approximately 70% by weight of monomeric units of pentafluoropropylene combined in the polymeric chain, with the remainder consisting of units derived from vinylidene fluoride. The mechanical characteristics of the copolymers of this invention vary gradually, according to the content of combined pentafluoropropylene, from a prevailingly thermoplastic to a prevailingly elastomeric material.

Copolymers having thermoplastic characteristics, to a more or less remarkable extent, contain from 1 to 15% by weight of combined units of pentafluoropropylene, while the copolymers which after vulcanization show elastomeric properties to a more or less appreciable degree having a combined pentafluoropropylene content in the range of between 10% and approximately 70% by weight. The elastomeric characteristics appear prevailingly in copolymers having a combined pentafluoropropylene content ranging from 20% to approximately 70% by weight.

The particular compositions of the copolymers and consequently their characteristics depend to a large extent on the composition of the monomer mixture being reacted. When, for instance, the copolymerization is carried out, through practically complete conversions, in the presence of monomeric mixtures containing 1% to 15% by volume of pentafluoropropylene, with the remainder consisting of vinylidene fluoride, copolymers are produced which are still partially crystalline at room temperature and endowed with excellent flexibility in a wide temperature range without showing embrittlement. The copolymers obtained through polymerization of monomers having this composition range can be very easily worked from the melt and are soluble at room temperatures in numerous organic solvents, such as e.g. esters, ketones, starches etc. By evaporation of these substances the copolymers settle easily in the form of transparent, strong and very flexible films of desired thickness.

If the copolymerization is carried out on monomeric mixtures containing for instance more than approximately 15% and up to approximately 95% by volume of pentafluoropropylene, copolymers are obtained that have the aspect of unvulcanized rubbers and may contain up to approximately 50% by mols (approximately 70% by weight) of combined pentafluoropropylene. These products are normally amorphous, soluble in certain solvents such as esters and ketones, are characterized by a low torsion modulus and retain plastic properties within a wide range of temperatures.

It is apparent that by varying the composition of the monomeric mixture of pentafluoropropylene and vinylidene fluoride being reacted within wide limits, copolymeric products can be obtained with ratios varying at will within wide limits between the two different monomeric units combined in the copolymer chains, said products being characterized by different physical properties.

The copolymers with elastomeric properties obtained in accordance with the present invention can be subjected to further treatments to yield elastomers having excellent physical and chemical properties. These treatments are vulcanization processes which probably bring about cross-linking between different copolymer macromolecules, thereby appreciably increasing the mechanical resistance and elastic recovery of the material. Compounding of suitable mixes and curing treatments are operations well known to the art and may be carried out by means of conventional methods and equipment with the copolymers of the present invention. Particularly effective in vulcanizing elastomeric copolymers of vinylidene fluoride and pentafluoropropylene are those methods which make use of poly-functional organic bases such as e.g. aliphatic and non-aliphatic polyamines. Examples of said vulcanizing agents include hexamethylenediamine, the carbamate of hexamethylenediamine, diethylenetriamine, triethylenetetramine, cycloalkyl diamines, etc. Peroxy organic compounds such as e.g. benzoyl peroxide, or ionizing radiations, high energy electrons, beta or gamma rays can be conveniently employed as vulcanization means. In addition to the vulcanizing agent, various other substances behaving as e.g. vulcanization accelerants, acid-acceptors, fillers, plasticizers, lubricating and reinforcing agents may be added to or mixed with the copolymers of the present invention according to techniques already well known in the art, prior to vulcanization.

A convenient vulcanization process for copolymers containing e.g. from 30 to 60% by weight of pentafluoropropylene consists of mixing 100 parts of copolymer with 10–20 parts of magnesium oxide, 20–40 parts of powdered coal and 1–3 parts of one of the diamines specified above, in a conventional roll-mixer, at room temperature. The compounded mass is then vulcanized by pressing in a mold at 120–220° C., preferably at 140–160° C., and then annealed at about 200° C. over a period of 4–24 hours. After the vulcanization treatment, elastomers are obtained that, in addition to having excellent mechanical properties, possess very high heat stability, are resistant to the attack of highly aggressive chemical reagents and are insoluble (with only a very slight swelling effect) in solvents such as ketones, esters, hydrocarbons, etc.

The copolymers of the present invention are particularly useful in the manufacture of films, plates, tapes, fibers and objects of various shapes and dimensions. They are also particularly adapted to be laid as protective layers on surfaces of various materials or used for impregnating purposes, by means of conventional methods.

The copolymers of the present invention are particularly useful as vulcanized elastomers, to form gaskets, tubings, sidings, containers, etc., wherever particular resistance to temperature, mechanical stress and attack by fluid solvents or aggressive chemicals are required.

A few examples which are intended to be merely illustrative and not restrictive follow hereinbelow.

*Example 1*

Into a stainless steel autoclave of 120 cc. capacity were introduced the following components in the order named: 0.300 g. of $Na_2HPO_4.12H_2O$, 0.076 g. of $KH_2PO_4$, 0.017 g. of $(NH_4)_2S_2O_8$, 0.004 g. of $Na_2S_2O_5$, 150 mg. of a mixture of products of the formula $$H(CF_2-CF_2)_nCOONH_4$$

wherein $n$ ranges from 4 to 7, and 50 g. of air-free $H_2O$. While introducing these substances, the autoclave was maintained at the temperature of −78° C. in a bath of Dry Ice and acetone, and water was gradually added after introduction of each salt, in such a manner that the various salts were separated from each other by layers of frozen water. The autoclave was then closed and a high vacuum produced therein. 1.98 g. of 1,2,3,3,3-pentafluoropropene and 18.4 g. of vinylidene fluoride were then distilled under vacuum into the autoclave. The closed autoclave was placed into a 70° C. oil bath and kept at this temperature for 16 hours under reciprocal agitation. After 16 hours reaction, the residual monomers were discharged and the polymerization was practically quantitative. The autoclave was opened and a milky copolymer was discharged. The copolymer was coagulated by the addition of 10 cc. of concentrated HCl, and then it was thoroughly washed with distilled water and dried under a vacuum of 15 mm. Hg at 100° C. The dried copolymer weighed 20.0 g. When examined under a hot stage polarizing microscope, it showed a crystalline melting range of 124° C. to 135° C. The copolymer could be compression molded at temperatures e.g. about 150° C. into transparent, flexible plates showing the characteristic behavior of thermoplastic products.

The intrinsic viscosity measured in dimethylformamide at 110° C. was found to be 0.91 (100 cc./g.). Stretching tests carried out on specimens of the type described in ASTM D 412 D, but 15 mm. long in the middle, at a stretching rate of 50 mm./minute, gave the following results:

Ultimate tensile strength _____kg./cm.$^2$__ 310
Elongation at break _____percent__ 370

Elementary analysis showed a carbon content of 36.48% by weight, which corresponds to a content of 5% by mols of units derived from 1,2,3,3,3-pentafluoropropene in the copolymer. The copolymer was soluble in organic solvents, such as for instance dimethylformamide, at room temperature. By evaporation of these solutions, settling of the polymer in the form of a homogeneous, transparent and flexible film could be easily obtained.

*Example 2*

Into an autoclave described in Example 1 and according to the same procedure, were introduced 0.034 g. of $(NH_4)_2S_2O_8$, 0.008 g. of $Na_2S_2O_5$, 0.300 g. of $$Na_2HPO_4 \cdot 12H_2O$$

0.074 g. of $KH_2PO_4$, 0.150 g. of ammonium perfluorocaprilate, and 50 g. of air-free $H_2O$. 11.88 g. of 1,2,3,3,3-pentafluoropropene and 13.44 g. vinylidene fluoride were then introduced into the closed autoclave by vacuum distillation, so as to form a monomeric mixture consisting of 30% by mols of pentafluoropropylene and 70% by mols of vinylidene fluoride. The autoclave was then placed into a 70° C. oil bath and kept at this temperature for 16 hours under reciprocal agitation. The polymerization was practically quantitative. At the end, a milky suspension of copolymer was discharged from the autoclave, from which suspension the copolymer was precipitated by the addition of 10 cc. of HCl. This copolymer was thoroughly washed with distilled water, dried at 100° C. under a vacuum of 15 mm. Hg and calendered. It weighed 24.20 g. and had the typical aspect of unvulcanized rubber. The copolymer, containing 65.2% by weight of fluorine and 32.75% of carbon, therefore had an average composition of 29.4% by mols of units derived from 1,2,3,3,3-pentafluoropropene. It showed an intrinsic viscosity of 2.64 (100 cc./g.) in dimethylketone at 30° C. 100 parts of this copolymer were mixed at room temperature, on a conventional rollmixer, with MgO (15 parts), MT (medium thermal) carbon black (20 parts) and dicinnaoxylidenehexaneethylenediamine (3 parts). The resulting mix was moulded into sheets about 1 mm. thick, by pressing at 150° C. for 30 minutes, under a stress of about 50 kg./cm.$^2$. These sheets were then kept in an air oven at 230° C. for 4 hours after having reached said temperature within 2 and a half hours. Specimens as described in Example 1 were obtained from them. Stretching tests on said specimens, carried out at 25° C. with a stretching rate of 50 mm./minute, gave the following characteristics:

Ultimate tensile strength _____kg./cm.$^2$__ 174
Elongation at break _____percent__ 307
Modulus at 100% _____kg./cm.$^2$__ 29
Modulus at 200% _____kg./cm.$^2$__ 77
Residual set _____percent__ [1] 10

[1] 10 minutes after breaking.

Specimens of the same vulcanized product, obtained as described above, 1 mm. thick, were maintained immersed in various solvents or chemical agents at 25° C. for 192 hours. The specimens were then dried and weighed, and then vacuum dried in an oven and weighed again. The obtained data are reported in Table 1.

TABLE 1

| Solvent or agent | Change in weight (percent) | Change in weight after drying (percent) |
|---|---|---|
| Acetone | +159.6 | −4.75 |
| Ethyl acetate | +191.4 | −4.35 |
| n-Heptane | 0.00 | −0.09 |
| Benzene | +14.2 | +1.43 |
| Sulphuric acid 98% | +3.2 | +2.30 |
| Nitric acid 65% | +12.8 | +5.56 |
| Aqueous NaOH 10% | +0.2 | −0.03 |

*Example 3*

Into the same autoclave and following the same procedure as described in Example 1, were introduced 0.008 g. of $(NH_4)_2S_2O_8$, 0.076 g. of $KH_2PO_4$, 0.300 g. of $Na_2HPO_4 \cdot 12H_2O$, 50 g. of air-free $H_2O$ and 0.300 g. of a dispersing agent having the formula $H(C_2F_4)_nCOONH_4$, as specified in Example 1. 19.8 g. of 1,2,3,3,3-pentafluoropropene and 9.6 g. of vinylidene fluoride were then distilled under vacuum into the closed autoclave, cooled to −78° C., so as to form a monomeric mixture containing 50% by moles of pentafluoropropylene. The autoclave was then maintained for 16 hours at 70° C. under reciprocal agitation. At the end, after removal of the residual gases, a clear suspension was discharged from the autoclave, from which the copolymer was precipitated by the addition of 10 cc. of concentrated HCl. The copolymer was dried at 100° C. and 15 mm. Hg, and calendered. It weighed 22.58 g. and had a carbon content of 31.51%, corresponding to an average content of 40.6% by moles of units derived from 1,2,3,3,3-pentafluoropropene. The copolymer showed an intrinsic viscosity of 1.71 (100 cc./g.) in methylethylketone at 30° C. The copolymer was vulcanized according to the procedure described in Example 2. The dynamometric characteristics, determined as described in said example, were found to be:

Ultimate tensile strength _____kg./cm.$^2$__ 158.2
Elongation at break _____percent__ 380
Modulus at 100% _____kg./cm.$^2$__ 32.5
Modulus at 200% _____kg./cm.$^2$__ 72
Residual set _____percent__ [1] 16.7

[1] 10 minutes after breaking.

*Example 4*

Into a stainless steel, 200 cc. autoclave, according to the procedure described in Example 1, were introduced: 0.035 g. of $(NH_4)_2S_2O_8$, 0.008 g. of $Na_2S_2O_5$, 0.380 g. $KH_2PO_4$ and 100 g. of air-free $H_2O$. 55.5 g. of 1,2,3,3,3-pentafluoropropene and 11.5 g. of vinylidene fluoride were then distilled under vacuum into the cooled autoclave, which was then kept under reciprocal agitation in a 70° C. oil bath for 16 hours. At the end, the residual gases being removed, a milky suspension of copolymer in water was discharged from the autoclave. The addition of 10 cc. of concentrated HCl brought about coagulation of the copolymer, which was washed with water, dried at 100° C. and 15 mm. Hg and calendered. The copolymer thus obtained weighed 23.5 g. and when analyzed showed a carbon content of 30.95%, corresponding to an average percentage of 46.2 moles of units derived from 1,2,3,3,3-pentafluoropropene. The copolymer intrinsic viscosity, measured in a methylethylketone solution at 30° C. was found to be 0.85 (100 cc./g.). A copolymer portion was mixed, on a conventional roll-mixer, at room temperature with MgO (15 parts/100 parts of copolymer). MT carbon black (medium thermal) (20 parts) and dicinnamylidenehexamethylendiamine (1 part). The resulting mix was molded into sheets, about 1 mm. thick, by pressing at 150° C. for 30 minutes. These sheets were then kept in an air oven for 4 hours at 230° C. and stretching tests were carried out on them as described in Example 2. The characteristics thus determined are as follows:

| | |
|---|---|
| Ultimate tensile strength kg./cm.² | 167 |
| Elongation at break percent | 500 |
| Modulus at 100% kg./cm.² | 26 |
| Modulus at 200% kg./cm.² | 56.5 |
| Residual set percent | [1] 10 |

[1] 10 minutes after breaking.

Example 5

Into the same autoclave and according to the same procedure as described in Example 1, were introduced 0.017 g. of $(NH_4)_2S_2O_8$, 0.004 g. of $Na_2S_2O_5$, 0.076 g. of $KH_2PO_4$, 0.300 g. of $Na_2HPO_4.12H_2O$, 50 g. of air-free $H_2O$ and 0.300 g. of a dispersing agent of the formula $H(C_2F_4)_nCOONH_4$ as specified in Example 1. Into the cooled autoclave were then introduced, by vacuum distillation, 7.92 g. of 1,2,3,3,3-pentafluoropropene and 15.36 g. of vinylidene fluoride, so as to form a monomer mixture containing 20% by moles of pentafluoropropylene. The autoclave was kept under reciprocal agitation for 16 hours, in a 70° C. oil bath. At the end, the copolymerization was practically quantitative and a clear aqueous copolymer dispersion was discharged from the autoclave. The copolymer was coagulated by the addition of HCl, washed with water, dried at 100° C. and 15 mm. Hg and calendered. It showed an intrinsic viscosity of 1.5 (100 cc./g.) in methylethylketone at 30° C. When analyzed, it exhibited a carbon content of 34.09%, corresponding to a 19.5% content by moles of units derived from 1,2,3,3,3,-pentafluoropropene. The copolymer, vulcanized according to the procedure described in Example 2, showed the following dynamometric properties:

| | |
|---|---|
| Ultimate tensile strength kg./cm.² | 174 |
| Elongation at break percent | 220 |
| Modulus at 100% kg./cm.² | 51 |
| Modulus at 200% kg./cm.² | 153 |
| Residual set percent | [1] 6.7 |

[1] 10 minutes after breaking.

Example 6

Into the autoclave described in Example 1 and according to the technique therein specified, were introduced 0.017 g. of $(NH_4)_2S_2O_8$, 0.004 g. of $Na_2S_2O_5$ and 50 g. of air-free $H_2O$. Afterwards, 29.4 g. of an equimolecular mixture of 1,2,3,3,3-pentafluoropropene and vinylidene fluoride were distilled under vacuum into the autoclave, which was then maintained under reciprocal agitation for 16 hours in an oil bath kept at 50° C. At the end, the residual gases were eliminated and a milky suspension of copolymer in water was discharged from the autoclave. The copolymer was coagulated by the addition of HCl, washed with water, dried and calendered. It weighed 18.19 g. and, when analyzed, showed a carbon content of 31.5%, which corresponds to a 41% content by moles of units derived from 1,2,3,3,3-pentafluoropropene. The intrinsic viscosity of the copolymer, measured in methylethylketone at 30° C., was found to be of 2.88 (100 cc./g.). A portion of the copolymer was subjected to vulcanization according to the procedure described in Example 2. The dynamometric properties, determined as described in Example 2, were found to be:

| | |
|---|---|
| Ultimate tensile strength kg./cm.² | 190 |
| Elongation at break percent | 356 |
| Modulus at 100% kg./cm.² | 30 |
| Modulus at 200% kg./cm.² | 73 |
| Residual set percent | [1] 6.7 |

[1] 10 minutes after breaking.

Example 7

Into the autoclave as described in Example 1, cooled to −78° C. by immersion in dry ice-acetone, were introduced 3 g. perfluorobutyric anhydride and 0.15 g. of 35% $H_2O_2$. The autoclave was closed and 30 g. of perfluorocyclobutane, 15.4 g. of 1,2,3,3,3-pentafluoropropene and 17.92 g. vinylidene fluoride were introduced therein by vacuum distillation. The autoclave was maintained under reciprocal agitation for 16 hours in an oil bath kept at 50° C. At the end, the residual gases were discharged and 1.1. g. of copolymer having the aspect of an unvulcanized rubber was recovered.

Example 8

Into the autoclave described in Example 1, were introduced 0.100 g. of alpha-alpha'-azobisisobutyronitrile. The autoclave was closed, evacuated under high vacuum and cooled to −78° C. 30 g. of perfluorocyclobutane, 15.4 g. of 1,2,3,3,3-pentafluoropropene and 17.9 g. of vinylidene fluoride were then introduced into the closed autoclave by vacuum distillation. The autoclave was then kept under agitation at 80° C. for 16 hours. At the end, the residual gases were discharged and a white, rubber-like copolymer was recovered.

Example 9

Into the autoclave of Example 1, were introduced 0.100 g. lauroylperoxide. The autoclave was then cooled to −78° C. and evacuated and 30 g. of perfluorocyclobutane, 15.8 g. of 1,2,3,3,3-pentafluoropropene and 17.9 g. of vinylidene fluoride were vacuum distilled therein. The autoclave was maintained for 16 hours at 80° C. under reciprocal agitation. At the end, after removal of the residual gases, a white copolymer having the aspect of an unvulcanized rubber was recovered.

Example 10

Into a 200 cc. autoclave according to the procedure described in Example 1, were introduced 0.035 g. of $(NH_4)_2S_2O_8$, 0.008 g. of $Na_2S_2O_5$, 0.152 g. of $KH_2PO_4$, 0.600 g. $Na_2HPO_4.12H_2O$, 100 g. of air-free $H_2O$ and 0.300 g. of a dispersing agent having the formula $H(C_2F_4)_nCOONH_4$, as specified in Example 1. 28.5 g. of 1,1,3,3,3-pentafluoropropene, 11.09 g. of 1,2,3,3,3-pentafluoropropene and 19.2 g. vinylidene fluoride were then vacuum distilled into the autoclave. The closed autoclave was then maintained in reciprocal agitation for 16 hours at 70° C. At the end, the unreacted gases were quantitatively collected and analyzed by gas chromatography. A clear aqueous dispersion of the terpolymer was discharged from the autoclave. The terpolymer was precipitated by the addition of HCl, thoroughly washed, dried at 100° C. and 15 mm. Hg and calendered. The terpolymer thus obtained weighed 31.01 g. On the basis of the amounts of monomers added, weight of polymer obtained and analysis of residual gases, the terpolymer was found to contain 5.3% by weight of units derived from 1,1,3,3,3-pentafluoropropene, 35.5% by weight of units derived from 1,2,3,3,3-pentafluoropropene, and the remaining 69.2% by weight consisting of units derived from vinylidene fluoride. When analyzed, the terpolymer appeared to contain 33.31% of carbon, which corresponds to a total content of 40.98% by weight of combined units of pentafluoropropenes. A copolymer portion was subjected to vulcanization as described in Example 4, and its dynamometric characteristics, measured as described in Example 2, were found to be:

| | |
|---|---|
| Ultimate tensile strength kg./cm.² | 152 |
| Elongation at break percent | 269 |
| Modulus at 100% kg./cm.² | 33 |
| Modulus at 200% kg./cm.² | 89 |
| Residual set percent | [1] 10 |

[1] 10 minutes after breaking.

What is claimed is:
1. A fluorinated copolymer consisting of combined monomeric units of vinylidene fluoride and at least 1% by weight of the combined monomeric units of 1,2,3,3,3-pentafluoropropylene.
2. The copolymer of claim 1 wherein 30 to 99% by weight of the combined monomeric units are derived from vinylidene fluoride.

3. The copolymer of claim 1 which possesses thermoplastic properties and contains from about 85% to about 99% by weight of the combined monomeric units derived from vinylidene fluoride.

4. The copolymer of claim 1 which possesses elastomeric properties and contains from about 30% to about 85% by weight of the combined monomeric units derived from vinylidene fluoride.

5. A shaped article obtained from the copolymer of claim 3.

6. A latex containing the copolymer of claim 1.

7. A dispersion containing the copolymer of claim 1.

8. A solution containing the copolymer of claim 1.

9. A vulcanized elastomer of the copolymer of claim 4.

10. A shaped article obtained from the vulcanized elastomer of claim 9.

11. A process for preparing fluorinated copolymers which comprises reacting a mixture of from 99 to 5 parts by weight of vinylidene fluoride and from 1 to 95 parts by weight of 1,2,3,3,3-pentafluoropropylene, in the presence of a polymerization free-radical initiator, at temperatures between −30° C. and 200° C. under pressure ranging from atmospheric pressure to 300 atm.

12. The process of claim 11 wherein the reactants are in suspension.

13. The process of claim 11 wherein the reactants are in emulsion.

14. The process of claim 11 wherein the reactants are in solution.

15. The process of claim 11 wherein the reaction is carried out between the temperatures of 0° and 150° C.

16. The process of claim 11 wherein the free-radical initiator is an organic peroxy compound.

17. The process of claim 11 wherein the free-radical initiator is an inorganic peroxy compound.

18. The process of claim 11 wherein the free-radical initiator is an aliphatic azo compound.

19. The process of claim 11 wherein the free-radical initiator is employed in amounts ranging from 0.001 to 5 parts by weight per 100 parts by weight of the reactants.

20. The process of claim 11 wherein the free-radical initiator is employed in amounts ranging from 0.01 to 2 parts by weight per 100 parts by weight of the reactants.

21. The process of claim 11 wherein the reaction medium is composed of the reactants which are at least in part in the liquid state under the reaction conditions.

22. The process of claim 11 wherein the reaction is carried out in an aqueous medium and the free-radical initiator is water soluble.

23. The process of claim 11 wherein the reaction is carried out in the presence of from 0.001 to 1% by weight of the reactants of a polymerization activator.

24. The process of claim 11 wherein the reaction is carried out in the presence of from 0.001 to 1% by weight of the reactants of a polymerization accelerator.

25. The process of claim 11 wherein the reaction is carried out in the presence of from 0.1 to 10% by weight of the reactants of a buffer.

26. The process of claim 11 wherein the reaction is carried out in the presence of from 0.001 to 1% by weight of the reactants of a chain transfer agent.

27. The process of claim 11, wherein the reaction is carried out in the presence of from 0.001 to 5% by weight of the reactants of a dispersing agent.

References Cited

UNITED STATES PATENTS

| | | | |
|---|---|---|---|
| 3,163,628 | 12/1964 | Bolstad | 260—8.77 |
| 3,243,411 | 3/1966 | Tawney et al. | 260—8.77 |

JOSEPH L. SCHOFER, Primary Examiner.

JAMES A. SEIDLECK, Examiner.

M. L. BERCH, J. A. DONAHUE, Assistant Examiners.

UNITED STATES PATENT OFFICE
CERTIFICATE OF CORRECTION

Patent No. 3,331,823                          July 18, 1967

Dario Sianesi et al.

It is hereby certified that error appears in the above numbered patent requiring correction and that the said Letters Patent should read as corrected below.

Column 2, line 42, for "(1953)." read -- (1953) ). --; line 49, for "de-hydrafluorination" read -- de-hydrofluorination --; line 59, for "of suitable" read -- of, suitable --; column 3, line 13, for "attained" read -- obtained --; line 49, for "and ethers, ketones" read -- , ethers and ketones --; column 4, line 36, for "process" read -- possess --; column 5, line 24, for "having" read -- have --; column 7, line 23, for "Into an" read -- Into the --; line 26, for "$Na_2HPO_4 \cdot 12H_2O$" read -- $Na_2HPO_4.12H_2O$, --; line 52, for "dicinnaoxylidenehexaneethylene-" read -- dicinnamylidenehexamethylene- --; column 8, line 41, for "158.2" read -- 158.5 --; line 65, for "46.2 moles" read -- 46.2 by moles --; line 72, for "methylendiamine" read -- methylenediamine --; column 10, line 6, for "1.1.g" read -- 1.1 g --.

Signed and sealed this 25th day of June 1968.

(SEAL)
Attest:

EDWARD M. FLETCHER, JR.                      EDWARD J. BRENNER
Attesting Officer                            Commissioner of Patents